(12) United States Patent
Shen et al.

(10) Patent No.: US 11,605,865 B2
(45) Date of Patent: Mar. 14, 2023

(54) SEPARATOR ASSEMBLY, BATTERY MODULE, BATTERY PACK, APPARATUS AND MANUFACTURING METHOD

(71) Applicant: Contemporary Amperex Technology Co., Limited, Ningde (CN)

(72) Inventors: Sheng Shen, Ningde (CN); Yangzhi Huang, Ningde (CN); Jihua Yao, Ningde (CN); Yanhuo Xiang, Ningde (CN); Haixing Gao, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/547,299

(22) Filed: Dec. 10, 2021

(65) Prior Publication Data

US 2022/0102823 A1    Mar. 31, 2022

Related U.S. Application Data

(63) Continuation of application No. PCT/CN2020/125486, filed on Oct. 30, 2020.

(30) Foreign Application Priority Data

Dec. 27, 2019  (CN) .......................... 201911377593.2

(51) Int. Cl.
*H01M 50/593* (2021.01)
*H01M 50/588* (2021.01)
(Continued)

(52) U.S. Cl.
CPC ....... *H01M 50/588* (2021.01); *H01M 50/503* (2021.01); *H01M 50/519* (2021.01); *H01M 50/593* (2021.01); *H01R 12/51* (2013.01)

(58) Field of Classification Search
CPC ............ H01M 50/588; H01M 50/503; H01M 50/519; H01M 50/593; H01M 50/209;
(Continued)

(56) References Cited

U.S. PATENT DOCUMENTS

| 2011/0045329 | A1* | 2/2011 | Ikeda | .................. H01M 10/482 |
|---|---|---|---|---|
| | | | | 429/91 |
| 2012/0251872 | A1 | 10/2012 | Kim | |

(Continued)

FOREIGN PATENT DOCUMENTS

| CN | 103390742 A | 11/2013 |
|---|---|---|
| CN | 103541906 A | 1/2014 |

(Continued)

OTHER PUBLICATIONS

The International search report for PCT Application No. PCT/CN2020/125486, dated Feb. 3, 2021, 13 pages.

(Continued)

*Primary Examiner* — Stephen J Yanchuk
(74) *Attorney, Agent, or Firm* — East IP P.C.

(57) ABSTRACT

The application provides a separator assembly, a battery module, a battery pack, an apparatus, and a manufacturing method. The separator assembly includes: an insulating plate, a circuit board arranged on the insulating plate, busbars arranged on the insulating plate on at least one side of the circuit board, and connection sheets connected between the busbars and the circuit board. The connection sheets include an upper connection sheet and a lower connection sheet. The insulating plate includes a first surface and a second surface opposite to each other. The upper connection sheet is arranged on the first surface, and the insulating plate and the lower connection sheet are arranged to be at least partially overlapped in the height direction of (Continued)

the separator assembly, and at least a portion of the lower connection sheet is arranged on the second surface.

19 Claims, 7 Drawing Sheets

(51) Int. Cl.
*H01M 50/519* (2021.01)
*H01M 50/503* (2021.01)
*H01R 12/51* (2011.01)

(58) Field of Classification Search
CPC ............ H01M 50/284; H01M 50/507; H01M 10/0445; H01M 2220/20; H01R 12/51; Y02E 60/10; Y02P 70/50
See application file for complete search history.

(56) References Cited

U.S. PATENT DOCUMENTS

| | | | |
|---|---|---|---|
| 2014/0017533 | A1 | 1/2014 | Nishihara et al. |
| 2014/0335393 | A1 | 11/2014 | Wada et al. |
| 2020/0136118 | A1* | 4/2020 | Weinberger ......... H01M 50/209 |

FOREIGN PATENT DOCUMENTS

| | | | |
|---|---|---|---|
| CN | 104393211 | A | 3/2015 |
| CN | 105322123 | A | 2/2016 |
| CN | 205248354 | U | 5/2016 |
| CN | 107123837 | A | 9/2017 |
| CN | 207398252 | U | 5/2018 |
| CN | 207801088 | U | 8/2018 |
| CN | 207967149 | U | 10/2018 |
| CN | 208127288 | U | 11/2018 |
| CN | 109524608 | A | 3/2019 |
| CN | 110391515 | A | 10/2019 |
| DE | 102010045700 | A1 | 3/2012 |
| DE | 112015000809 | T5 | 11/2016 |
| EP | 2538469 | A2 | 12/2012 |
| JP | 2013214497 | A | 10/2013 |
| JP | 2019057498 | A | 4/2019 |
| JP | 2019106253 | A | 6/2019 |
| JP | 2019149342 | A | 9/2019 |
| KR | 20170055008 | A | 5/2017 |
| WO | 2013084941 | A1 | 6/2013 |
| WO | 2017147821 | A1 | 9/2017 |

OTHER PUBLICATIONS

The First Office Action for China Application No. 201911377593.2, dated Jun. 2, 2021, 10 pages.
The Notification Grant Action for China Application No. 201911377593.2, dated Aug. 9, 2021, 8 pages.
The extended European search report for EP Application No. 20905634.0, dated Mar. 4, 2022, 7 pages.
The First Examination Report for EP Application No. 20905634.0, dated Jul. 27, 2022, 4 pages.

* cited by examiner

SEPARATOR ASSEMBLY, BATTERY MODULE, BATTERY PACK, APPARATUS AND MANUFACTURING METHOD

CROSS REFERENCE TO RELATED APPLICATION

This application is a continuation of International Application No. PCT/CN2020/125486 filed on Oct. 30, 2020, which claims the priority benefits of Chinese Patent Application No. 201911377593.2 filed on Dec. 27, 2019 and entitled "SEPARATOR ASSEMBLY, BATTERY MODULE, BATTERY PACK, APPARATUS AND MANUFACTURING METHOD", both of which are incorporated herein by reference in their entireties.

FIELD

The application relates to the technical field of energy storage, in particular to a separator assembly, a battery module, a battery pack, an apparatus and a manufacturing method.

BACKGROUND

With the transformation of energy structure, sustainable electric power has gradually replaced traditional fossil fuels as the mainstream energy. For example, electric automobiles are gradually replacing traditional fuel vehicles as a new development trend, so that the chargeable-and-dischargeable batteries have been rapidly developed.

With the popularization of new energy pure electric automobiles, the requirements of the various main engine plants for power battery pack are becoming more and more diversified, and in particular the requirements for energy density, safety and compatibility of the modules are becoming higher and higher. With respect to the current battery module in which a plurality of internal battery cells are connected in series, the conventional arrangement for connection sheet is insufficient in terms of safety.

Therefore, there is an urgent need for a new separator assembly, battery module, battery pack, apparatus, and manufacturing method.

SUMMARY

The application provides a separator assembly, a battery module, a battery pack, an apparatus and a manufacturing method, which are intended to improve anti-vibration property for the separator assembly.

An embodiment of an aspect of the application provides a separator assembly comprising an insulating plate, a circuit board, busbars and connection sheets. The circuit board is arranged on the insulating plate. The busbars are arranged on the insulating plate on at least one side of the circuit board, and the connection sheets are connected between the busbars and the circuit board. Wherein the connection sheets comprise an upper connection sheet and a lower connection sheet. The insulating plate comprises a first surface and a second surface opposite to each other. The upper connection sheet is arranged on the first surface. The insulating plate and the lower connection sheet are arranged to be at least partially overlapped in the height direction of the separator assembly, and at least a portion of the lower connection sheet is arranged on the second surface.

According to an aspect of the application, the busbars comprise a crossover busbar and an abutting busbar. On the same side of the circuit board, at least a portion of the crossover busbar is located on the side of the abutting busbar facing towards the circuit board. The crossover busbar is connected to the board via the upper connection sheet and the abutting busbar is connected to the circuit board via the lower connection sheet. The lower connection sheet and the crossover busbar are at least partially overlapped in the height direction.

According to an aspect of the application, the crossover busbar comprises a shoulder, a first connection portion and a second connection portion at two ends of the shoulder, and on the same side of the circuit board, the shoulder is located on the side of the abutting busbar facing towards the circuit board. The shoulder is connected to the circuit board via the upper connection sheet. The lower connection sheet and the shoulder are at least partially overlapped in the height direction.

According to an aspect of the application, the lower connection sheet comprises a first divisional sheet connected to an abutting busbar. The first divisional sheet and the crossover busbar are at least partially overlapped in the height direction, and two ends of the first divisional sheet protrude from two sides of the crossover busbar in a width direction of the separator assembly.

According to an aspect of the application, the lower connection sheet further comprises a second divisional sheet, via which the first divisional sheet is connected to the circuit board.

According to an aspect of the application, the circuit board is provided with a relief notch at an edge in the width direction. The first divisional sheet extends from the abutting busbar to the relief notch, and the first divisional sheet is interconnected with the second divisional sheet at the relief notch.

According to an aspect of the application, a surface of the insulating plate is recessed to form a groove, in which at least a portion of the lower connection sheet is engaged.

According to an aspect of the application, the groove has a bottom wall and a side wall connected to the peripheral side of the bottom wall. The bottom wall is provided with a post. The lower connection sheet is provided with a locating hole penetrating there. The post is engaged in the locating hole.

According to an aspect of the application, the separator assembly further comprises an insulating fixing member adapted to the groove in shape, and the fixing member fixes the lower connection sheet in the groove.

According to an aspect of the application, the fixing member is provided with a first plug-in part, and the groove is provided with a second plug-in part adapted to the first plug-in part. The fixing member is fixed in the groove by the first plug-in part and the second plug-in part.

According to an aspect of the application, the fixing member comprises a body portion. The first plug-in part is a plug-in sheet arranged to protrude from the body portion, and the second plug-in part is a plug-in slot formed by the recessed side wall.

According to an aspect of the application, the plug-in sheet is provided with a plug-in hole penetrating there, the plug-in slot is provided with a plug-in post therein, and the plug-in hole and the plug-in post are adapted in shape, such that the plug-in post is located in the plug-in hole when the plug-in sheet is located in the plug-in slot.

According to an aspect of the application, the fixing member is provided with a plurality of first plug-in parts arranged at intervals on the peripheral side of the body portion. There are a plurality of second plug-in parts corresponding to the plurality of first plug-in parts, and the plurality of second plug-in parts are distributed at intervals on the side wall of the groove.

According to an aspect of the application, the fixing member further comprises an enclosing portion and a cover portion sequentially connected in the extending direction thereof. The enclosing portion has a through hole penetrating in the extending direction. The lower connection sheet is inserted into the through hole. The cover portion covers a portion of the lower connection sheet in the groove.

Another aspect of the application provides a battery module comprising: a plurality of battery cells arranged side by side in a length direction of the battery module; the aforesaid separator assembly, the busbars being connected to the battery cells respectively to form a power supply path.

Still another aspect of the application provides a battery pack comprising: a case having an accommodation space; the aforesaid battery module arranged in the accommodation space.

Yet another aspect of the application provides an apparatus employing a battery module as a power source, which comprises a power supply for supplying power to the apparatus and the aforesaid battery module configured to supply electric energy to the power supply.

Still yet another aspect of the application provides a method of manufacturing a separator assembly for a battery module, comprising:

providing a circuit board and busbars on an insulating plate and the busbars being located on at least one side of the circuit board in a width direction of the separator assembly;

providing connection sheets, the connection sheets being arranged between the busbars and the circuit board, wherein the connection sheets comprises an upper connection sheet and a lower connection sheet, the insulating plate comprising a first surface and a second surface opposite to each other, the upper connection sheet being arranged on the first surface, the insulating plate and the lower connection sheet being arranged to be at least partially overlapped in a height direction of the separator assembly, and at least a portion of the lower connection sheet being arranged on the second surface.

According to an aspect of the application, the lower connection sheet comprises a first divisional sheet and a second divisional sheet.

The step of providing the circuit board and the busbars on the insulating plate and the busbars being located on at least one side of the circuit board in the width direction of the separator assembly further comprises:

forming a fixing member with the first divisional sheet, at least a portion of the first divisional sheet being wrapped by the fixing member, and two ends of the first divisional sheet protruding from the fixing member;

placing the fixing member with the first divisional sheet in a mold, injection molding the insulating plate, and at least a portion of the first divisional sheet being located on the second surface, the insulating plate having a first mounting hole and a second mounting hole penetrating there, one end of the first divisional sheet protruding into the first mounting hole.

The step of providing the circuit board and the busbars on the insulating plate and the busbars being located on at least one side of the circuit board in the width direction of the separator assembly further comprises:

the busbars comprising a crossover busbar and an abutting busbar, the abutting busbar being arranged in the first mounting hole, on the same side of the circuit board, arranging at least a portion of the crossover busbar on the side of the abutting busbar facing towards the circuit board, and two ends of the crossover busbar being arranged to be corresponding to the second mounting holes;

The step of providing the connection sheets comprises:

arranging the second divisional sheet between the first divisional sheet and the circuit board, arranging the upper connection sheet between the crossover busbar and the circuit board, and welding the upper connection sheet, the first divisional sheet and the second divisional sheet, such that the upper connection sheet is connected between the circuit board and the crossover busbar, the first divisional sheet being connected between the abutting busbar and the second divisional sheet, the second divisional sheet being connected between the circuit board and the first divisional sheet.

In the separator assembly of the embodiment of the application, the separator assembly comprises an insulating plate, a circuit board, busbars, and connection sheets. The connection sheets comprises an upper connection sheet and a lower connection sheet. The upper connection sheet is arranged on the first surface. The insulating plate and the lower connection sheet are arranged to be at least partially overlapped in the height direction of the separator assembly, and at least a portion of the lower connection sheet is arranged on the second surface. In the case of vibration of the separator assembly by force, since the upper connection sheet and at least a portion of the lower connection sheet are arranged at two sides of the insulating plate, a portion of the forces exerted by the lower connection sheet and the upper connection sheet on the insulating plate may cancel each other out, so as to reduce the force applied to the insulating plate. Thereby the vibration amplitude of the separator assembly is reduced and the anti-vibration property of the separator assembly is improved to ensure the stability of the relative positions of the various components in the separator assembly, such that the reliability of the connection between the components is enhanced.

BRIEF DESCRIPTION OF THE DRAWINGS

Other features, objects and advantages of the application will become more apparent upon reading the following detailed description of non-limiting embodiments with reference to the accompanying drawings, in which the same or similar reference numerals refer to identical or similar features.

Figure 1:
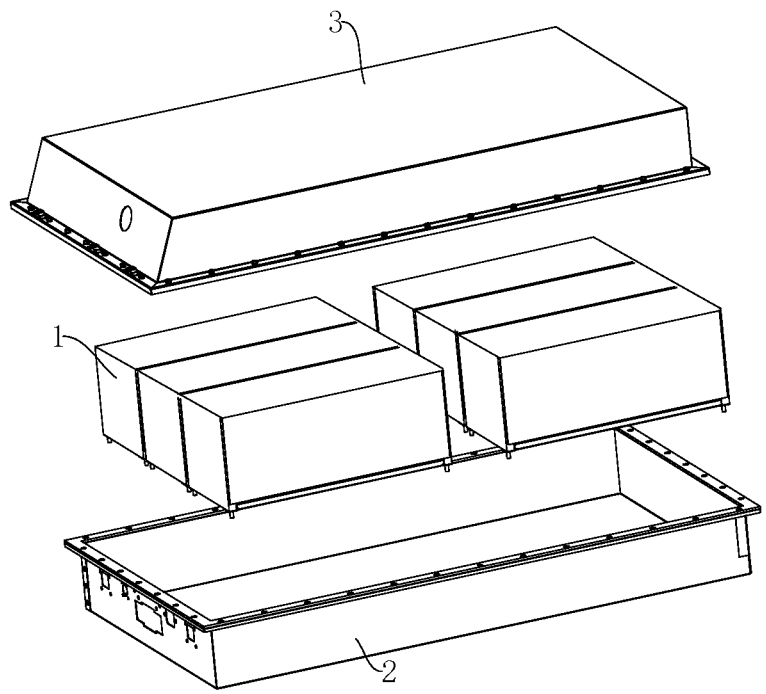
FIG. 1 is a schematic structural view of a battery pack according to an embodiment of the application.

LIST OF REFERENCES 1 battery module; 10 separator assembly;

100 insulating plate; 110 groove; 111 bottom wall; 112 side wall; 113 pillar; 114 fixing hole; 120 second plug-in part; 121 plug-in slot; 130 first mounting hole; 140 secondary mounting hole; 150 first surface; 160 second surface;

200 circuit board; 210 relief notch;

300 busbar; 310 crossover busbar; 311 shoulder; 312 first connection portion; 313 second connection portion; 320 abutting busbar;

400 connection sheet; 410 lower connection sheet; 411 first divisional sheet; 411a locating hole; 412 second divisional sheet; 420 upper connection sheet;

500 fixing member, 510 body portion; 511 enclosing portion; 511a through hole; 512 cover portion; 513 bottom surface; 514 top surface; 515 side surface; 520 first plug-in part; 521 plug-in sheet; 522 plug-in hole; 530 locating hole; 540 locating post;

20 battery cell; 21 pole;

30 housing;

2 upper cover;

3 case;

X width direction; Y length direction; Z height direction.

DETAILED DESCRIPTION

The features in various aspects and exemplary embodiments of the application will be described in details below. In the following detailed description, numerous specific details are set forth in order to provide a thorough understanding of the present application. However, it is apparent to a person skilled in the art that the application may be implemented without some of these specific details. The following description of the embodiments is for the purpose of better understanding of the application through showing examples of the application. In the drawings and the following description, at least a portion of well-known structures and techniques are not shown in order to avoid unnecessarily obscuring the present application, and, for clarity, the dimensions of a portion of the structures may be exaggerated. In addition, the features, structures and characters described hereafter may be combined in any suitable way in one or more embodiments.

In the description of the application, it is noted that, except as otherwise noted, the term "a plurality of" means two or more; the orientation or position relationship indicated by the terms "above", "below", "left", "right", "in", "out" is only for the purpose of brief description of the application, rather than indicating or implying that the noted unit or element is necessarily of the specific orientation or structured or operated in the specific orientation, thus, cannot be regarded as limit of the invention. In addition, the terms such as "first", "second" and the like are only for the purpose of description, and shall not be deemed to indicate or imply relative importance.

All the orientation terms present in the following description are the directions in the drawings, and do not limit a specific structure of the product according to the application. In the description of the application, it is also noted that, except as otherwise stipulated or limited explicitly, the terms "mount", "connect" shall be interpreted expansively, for example, it may be fixed connection, removable connection or integral connection; may be direct connection or indirect connection. For a person of ordinary skill in the art, the specific meaning of the above terms in the application can be interpreted depending on the specific situation.

For better understanding of the application, the separator assembly, the battery module, the battery pack, the apparatus and the manufacturing method thereof will be described below in detail in combination with FIGS. 1 to 13.

Embodiments of the application first provide a vehicle comprising a vehicle body and a battery pack disposed in the vehicle body.

Wherein, the vehicle is a new energy vehicle, which may be a pure electric vehicle or a hybrid vehicle or an extended range vehicle. The vehicle body is provided with a drive motor which is electrically connected to the battery pack and supplied with electric energy from the battery pack. The drive motor is connected to wheels on the vehicle body via a transmission mechanism so as to drive the vehicle to travel. Optionally, the battery pack may be horizontally disposed at the bottom of the vehicle body.

As shown in FIG. 1 which is a schematic structural view of a battery pack provided in an embodiment of the application, which battery pack comprises a case and a battery module 1 located in an accommodation space of the case.

The battery module 1 is housed in the case. There are one or more battery modules 1 disposed in the case. The type of the case is not limited. The case may be a frame-like case, a disk-like case, or a box-like case, etc., and in particular, the case may comprise a lower case part for accommodating the battery module and an upper case part closed with the lower case part.

Figure 2:
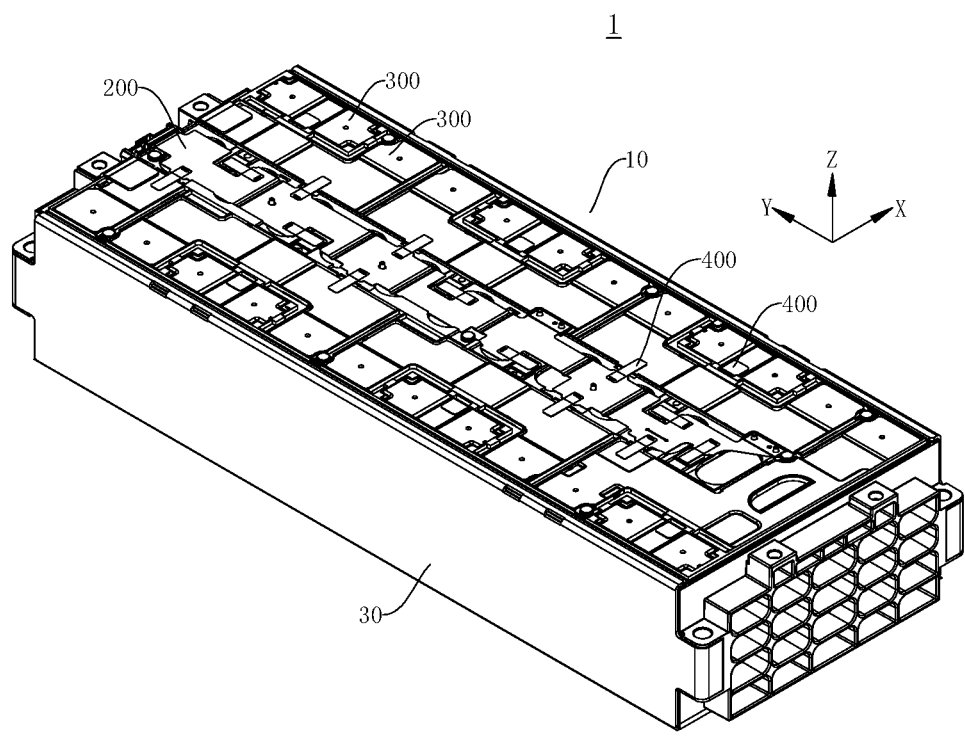
FIG. 2 is a schematic structural view of a battery module according to an embodiment of the application.
Figure 3:
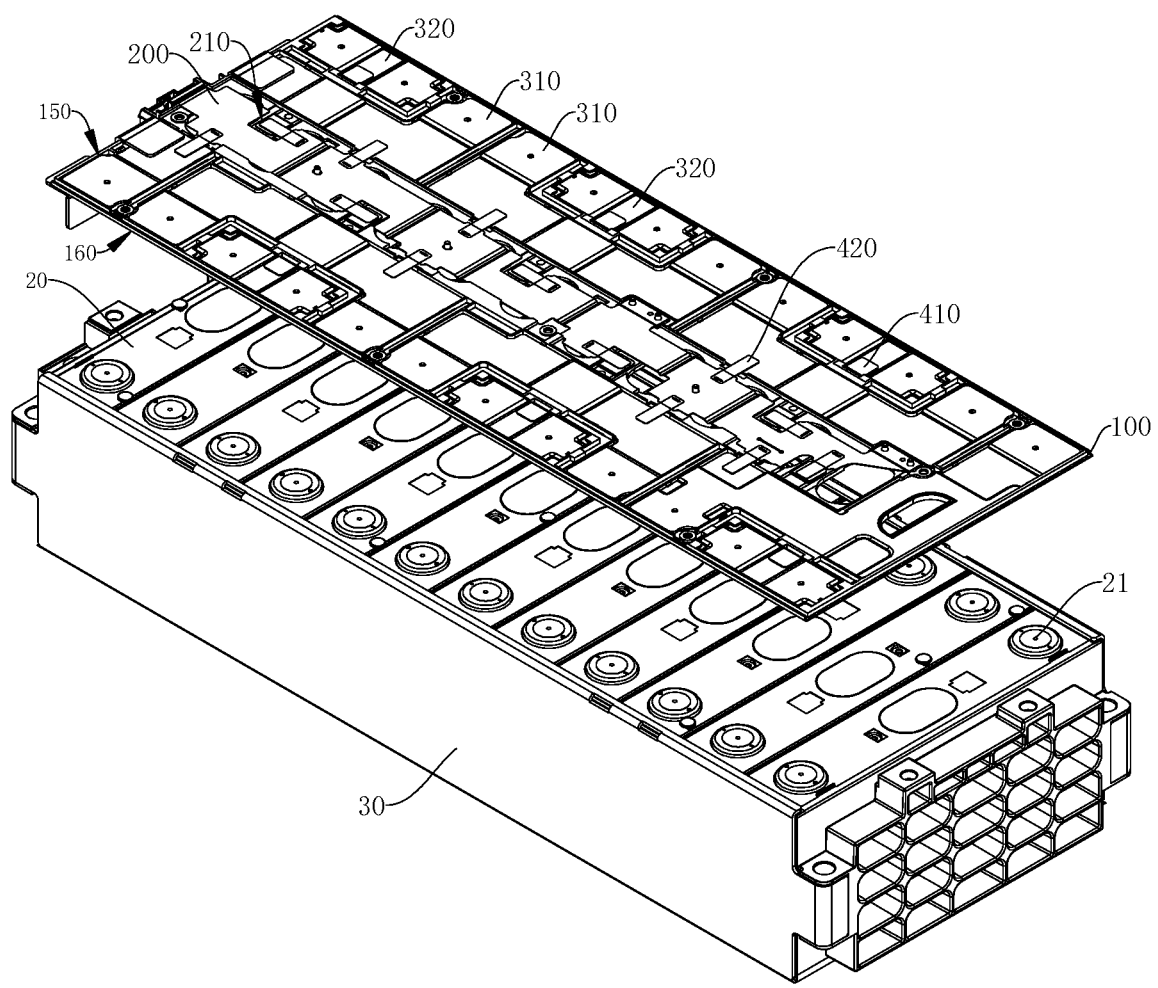
FIG. 3 is a schematic explosive structural view of FIG. 2.

The battery modules 1 may be arranged in various ways. FIG. 2 is a schematic structural view of a battery module 1 provided in an embodiment of the application, and FIG. 3 is a schematic explosive structural view of FIG. 2. The battery module 1 of the embodiment of the application comprises a housing 30, a plurality of battery cells 20 located in the housing 30 and a separator assembly 10 located on the top of the plurality of battery cells 20. The separator assembly 10 comprises an insulating plate 100, a circuit board 200 disposed on the insulating plate 100, a plurality of busbars 300, and connection sheets 400 connecting each busbar 300 and the circuit board 200. The busbars 300 and the circuit board 200 are arranged side by side in the width direction (X direction in FIG. 1) of the separator assembly 10, and the plurality of busbars 300 are connected to the plurality of battery cells 20 respectively to form a power supply path.

The width direction of the separator assembly 10 refers to the direction in which the circuit board 200 and the busbars 300 are arranged side by side, and the busbars 300 are disposed in the width direction on at least one side of the circuit board 200. There are two ways to arrange the busbars 300 in the width direction on at least one side of the circuit board 200. For example, the busbars 300 are disposed in the width direction on one side of the circuit board 200, or the busbars 300 are disposed in the width direction at both sides of the circuit board 200. As long as the circuit board 200 is provided with the busbars 300 in the width direction on at least one side.

The length direction (Y direction in FIG. 4) of the separator assembly 10 refers to the extension direction of the circuit board 200, and the circuit board 200 is formed by extending in the length direction.

The battery module 1 can be applied not only to a vehicle but also to other apparatuses. An embodiment of the application further provides an apparatus employing the battery module 1 as a power source, which comprises a power supply for supplying power to the apparatus and the aforesaid battery module 1 configured to supply electric energy to the power supply. The apparatus may be, but is not limited to, a vehicle, a ship, an aircraft, or the like.

There are various ways to arrange the connection sheets 400 in the separator assembly 10. For example, all the connection sheets 400 are arranged on the side of the busbar 300 facing away from the insulating plate 100.

Figure 4:
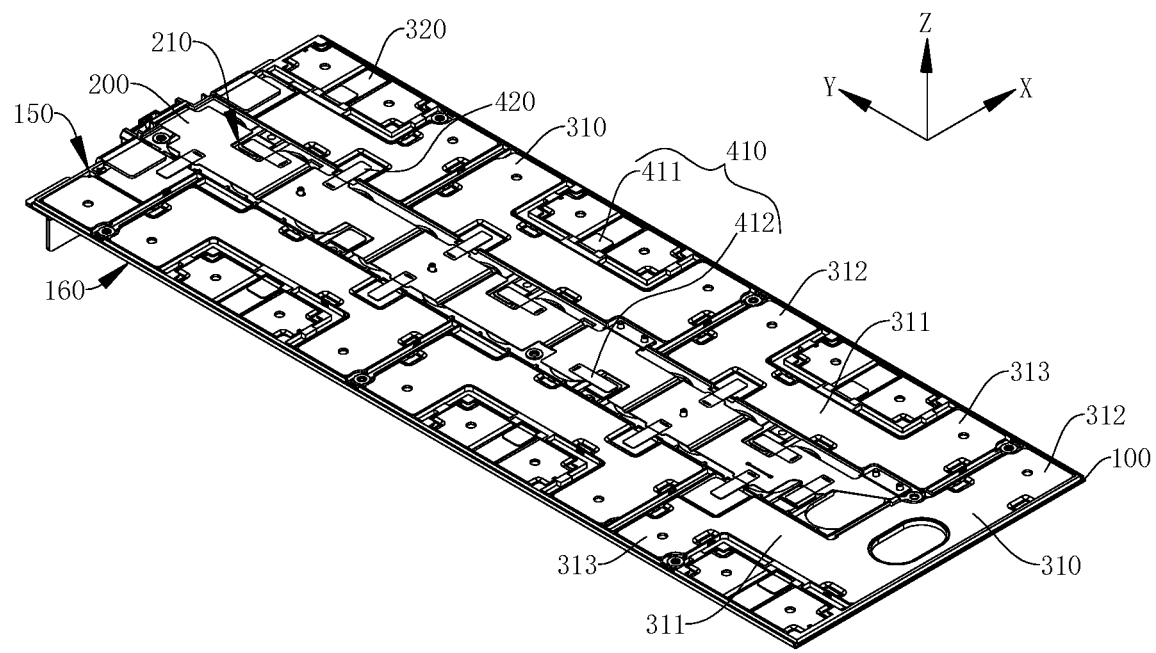
FIG. 4 is a schematic structural view of a separator assembly according to an embodiment of the application.
Figure 5:
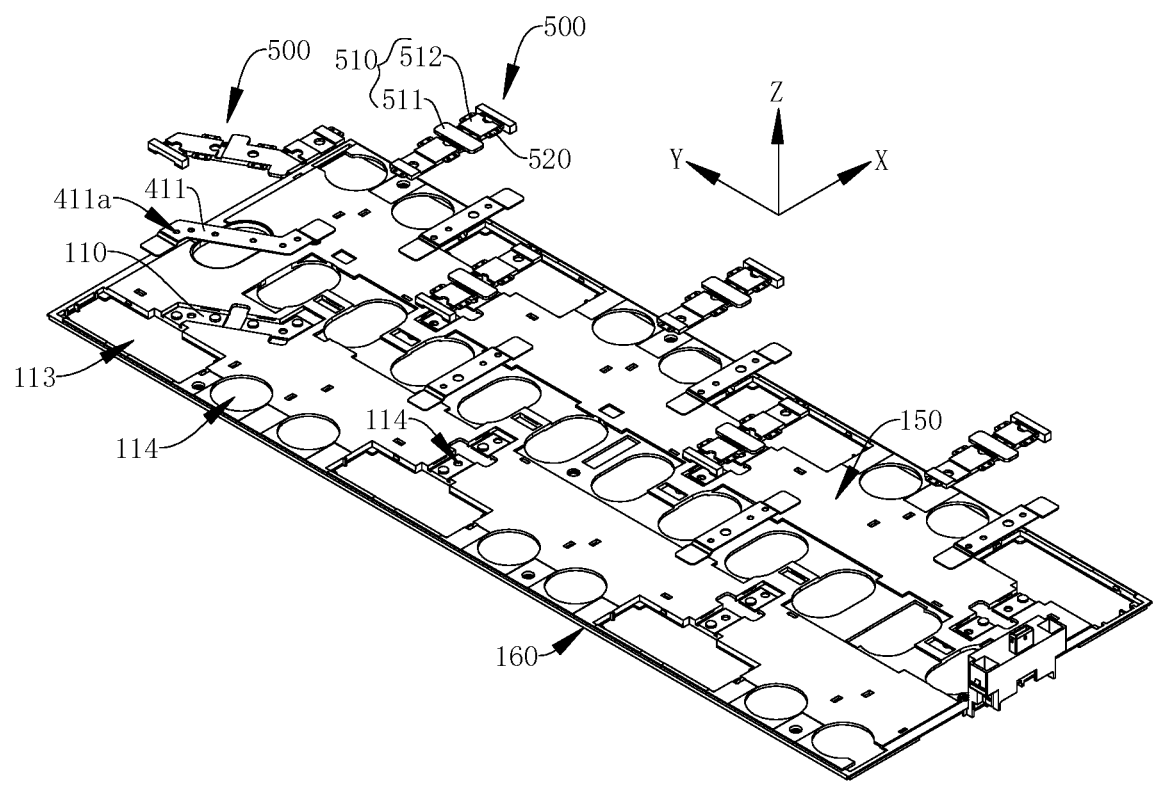
FIG. 5 is a schematic explosive structural view of FIG. 4.
Figure 6:
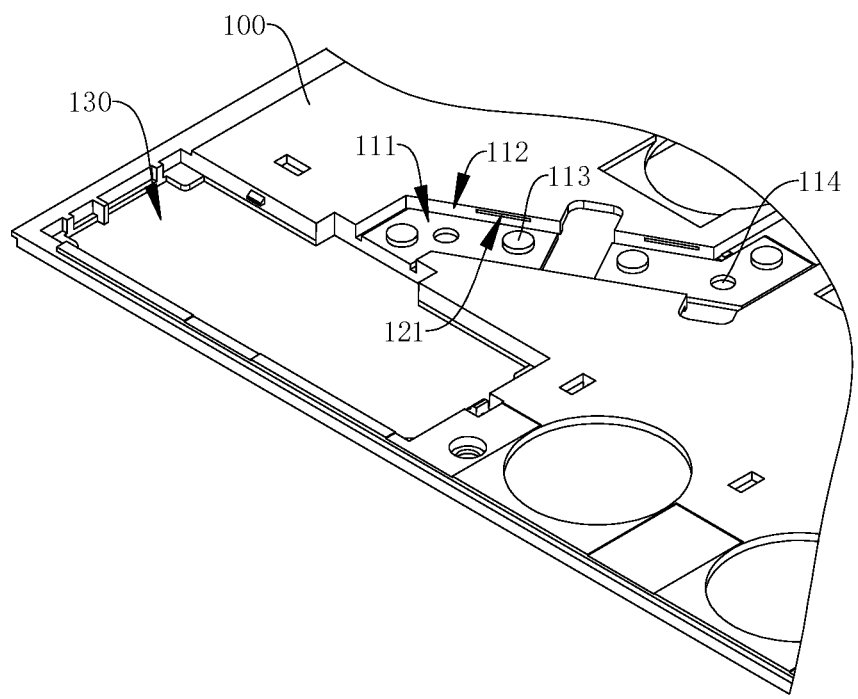
FIG. 6 is a partially enlarged schematic structural view of FIG. 5.

Referring to FIGS. 4 to 6, in some other optional embodiments, the plurality of connection sheets 400 comprise a lower connection sheet 410 and an upper connection sheet 420. The insulating plate 100 comprises a first surface 150 and a second surface 160 opposite to each other. The upper connection sheet 420 is arranged on the first surface 150. The insulating plate 100 and the lower connection sheet 410 are arranged to be at least partially overlapped in the height direction (Z direction in FIG. 4) of the separator assembly 10 and at least a portion of the lower connection sheet 410 is arranged on the second surface 160.

In the separator assembly 10 of the embodiment of the application, the separator assembly 10 comprises an insulating plate 100, a circuit board 200, busbars 300, and connection sheets 400. Wherein the connection sheets 400 comprises an upper connection sheet 420 and a lower connection sheet 410. The upper connection sheet 420 is arranged on the first surface 150. The insulating plate 100 and the lower connection sheet 410 are arranged to be at least partially overlapped in the height direction of the separator assembly 10, and at least a portion of the lower connection sheet 410 is arranged on the second surface 160. In the case of vibration of the separator assembly 10 by force, since the upper connection sheet 420 and at least a portion of the lower connection sheet 410 are arranged at two sides of the insulating plate 100, a portion of the forces exerted by the lower connection sheet 410 and the upper connection sheet 420 on the insulating plate 100 may cancel each other out, so as to reduce the force applied to the insulating plate 100. Thereby the vibration amplitude of the separator assembly 10 is reduced and the anti-vibration property of the separator assembly 10 is improved to ensure the stability of the relative positions of the various components in the separator assembly 10, such that the reliability of the connection between the components is enhanced.

The arrangement of the busbars 300 and the circuit board 200 is not limited. In some optional embodiments, the circuit board 200 is arranged near a middle position in the width direction of the separator assembly 10, and a plurality of busbars 300 are arranged at both sides of the circuit board 200.

There are various ways to arrange the bus bars 300. In some optional embodiments, the bus bars 300 comprises a crossover busbar 310 and an abutting busbar 320. On the same side of the circuit board 200, at least a portion of the crossover busbar 310 is located on the side of the abutting busbar 320 facing towards the circuit board 200, that is, at least a portion of the crossover busbar 310 is located between the abutting busbar 320 and the circuit board 200.

The crossover busbar 310 is connected to the circuit board 200 via the upper connection sheet 420, the abutting busbar 320 is connected to the circuit board 200 via the lower connection sheet 410, and the lower connection sheet 410 and the crossover busbar 310 are at least partially overlapped in the height direction.

Since at least a portion of the crossover busbar 310 is located between the abutting busbar 320 and the circuit board 200 and the lower connection sheet 410 spans the crossover busbar 310 and is connected between the abutting busbar 320 and the circuit board 200, the lower connection sheet 410 and the crossover busbar 310 are arranged to be at least partially overlapped. At least a portion of the lower connection sheet 410 being located on the side of the insulating plate 100 facing away from the crossover busbar 310 has no influence on the connection between the crossover busbar 310 and the circuit board 200, and can also ensure insulation between the lower connection sheet 410 and the crossover busbar 310, thereby improving the safety performance of the separator assembly 10.

There are various ways to arrange the crossover busbar 310. In some optional embodiments, the crossover busbar 310 comprises a shoulder 311 and a first connection portion 312 and a second connection portion 313 at two ends of the shoulder 311. On the same side of the circuit board 200, the shoulder 311 is located on the side of the abutting busbar 320 facing towards the circuit board 200. The shoulder 311 is connected to the circuit board 200 via the upper connection sheet 420. The lower connection sheet 410 and the shoulder 311 are arranged to be at least partially overlapped in the height direction.

In these optional embodiments, the crossover busbar 310 is connected to two battery cells 20 via the first connection portion 312 and the second connection portion 313 respectively, the shoulder 311 is located between the abutting busbar 320 and the circuit board 200, and the upper connection sheet 420 is connected between the shoulder 311 and the circuit board 200. The lower connection sheet 410 is located on the side of the insulating plate 100 facing away from the shoulder 311 and is arranged to be at least partially overlapped with the shoulder 311. The arrangement of the lower connection sheet 410 will affect neither the connection of the crossover busbar 310 and the battery cell 20 nor the connection of the shoulder 311 and the circuit board 200.

The shape of the crossover busbar 310 is not limited. The crossover busbar 310 is connected between the battery cells 20 arranged at intervals. For example, the crossover bar 310 may be U-shaped. The first connection portion 312 and the second connection portion 313 are spaced apart in the length direction of the separator assembly 10. Two adjacent battery cells 20 spaced apart are provided between the first connection portion 312 and the second connection portion 313. The abutting busbar 320 is connected between the adjacent two battery cells 20, and is located in the space formed and enclosed by the first connection portion 312, the second connection portion 313 and the shoulder 311.

Alternatively, the crossover busbar 310 is Z-shaped, the first connection portion 312 is formed by the shoulder 311 extending in the width direction away from the second connection portion 313, one battery cell 20 is provided between the first connection portion 312 and the second connection portion 313, and the first connection portion 312 and the second connection portion 313 extend towards two sides of the circuit board 200.

The shape of the abutting busbar 320 is not limited. The abutting busbar 320 is formed by extending in the length direction and are connected between two adjacent battery cells 20.

Figure 7:
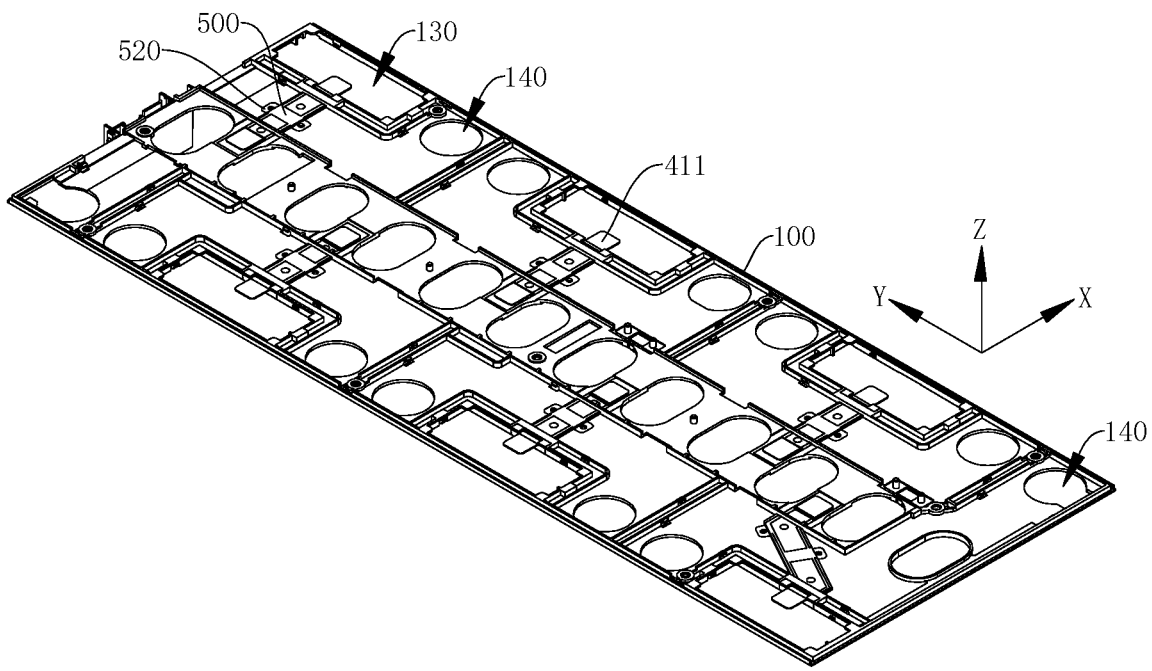
FIG. 7 is a schematic structural view of a process of assembling a separator assembly according to an embodiment of the application.
Figure 8:
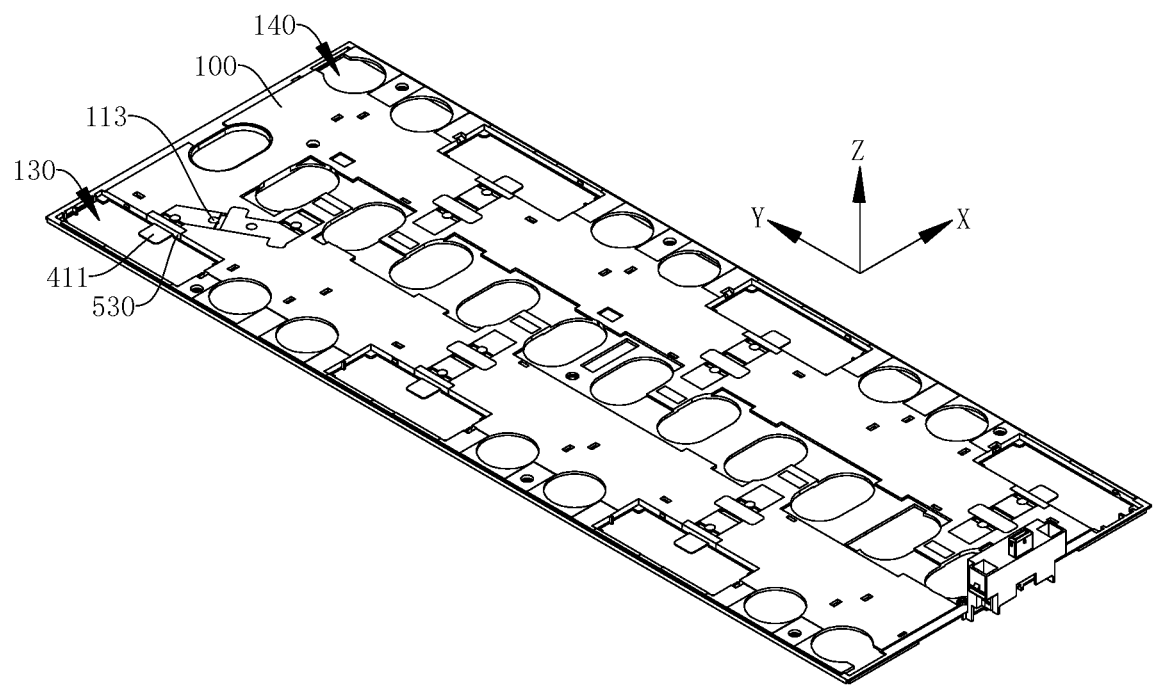
FIG. 8 is a rear view of FIG. 7.
Figure 9:
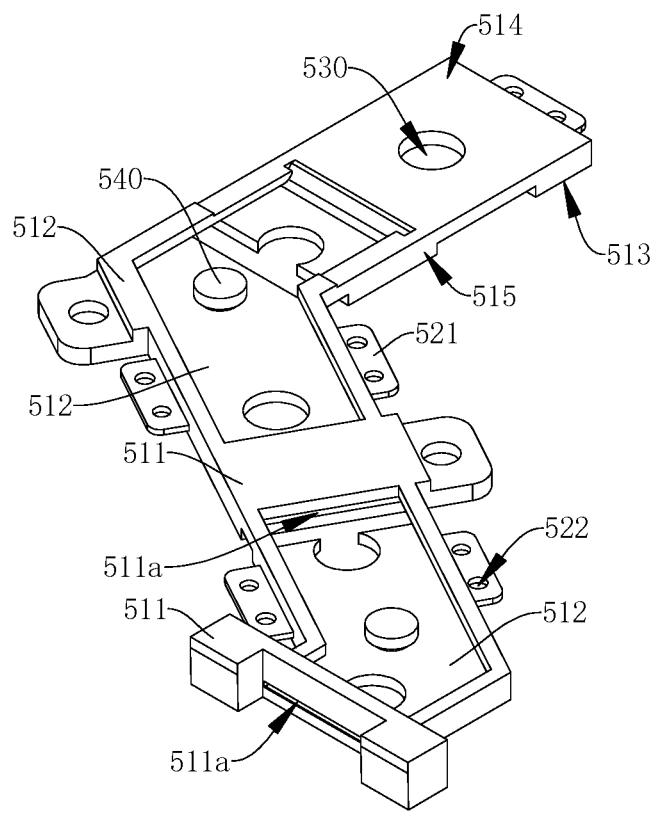
FIG. 9 is a schematic structural view of a fixing member of a separator assembly according to an embodiment of the application.
Figure 10:
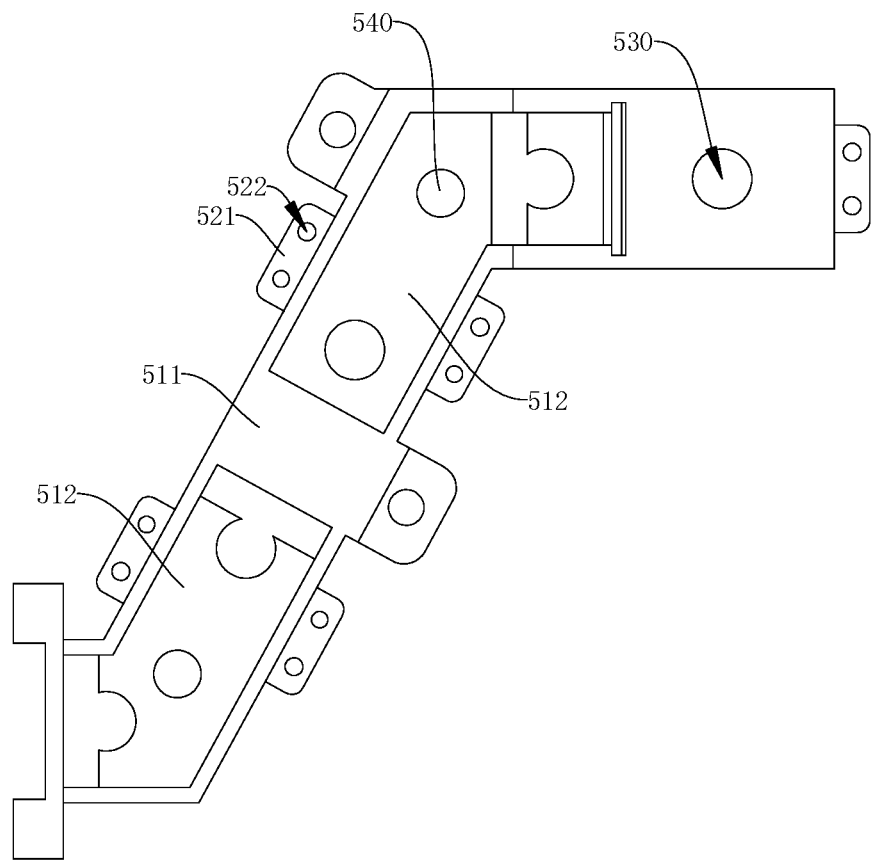
FIG. 10 is a schematic view of a plane structure of a fixing member of a separator assembly according to an embodiment of the application.
Figure 11:
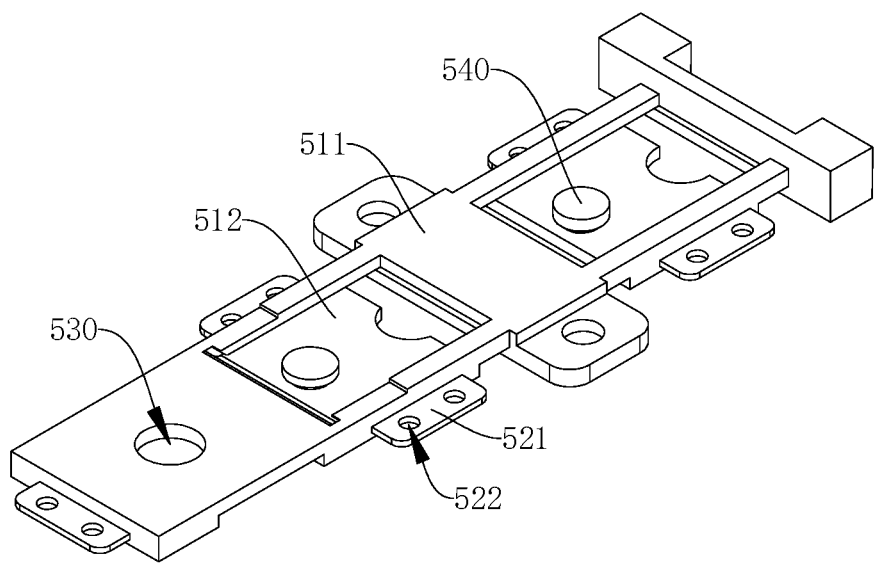
FIG. 11 is a schematic structural view of a fixing member of a separator assembly according to another embodiment of the application.
Figure 12:
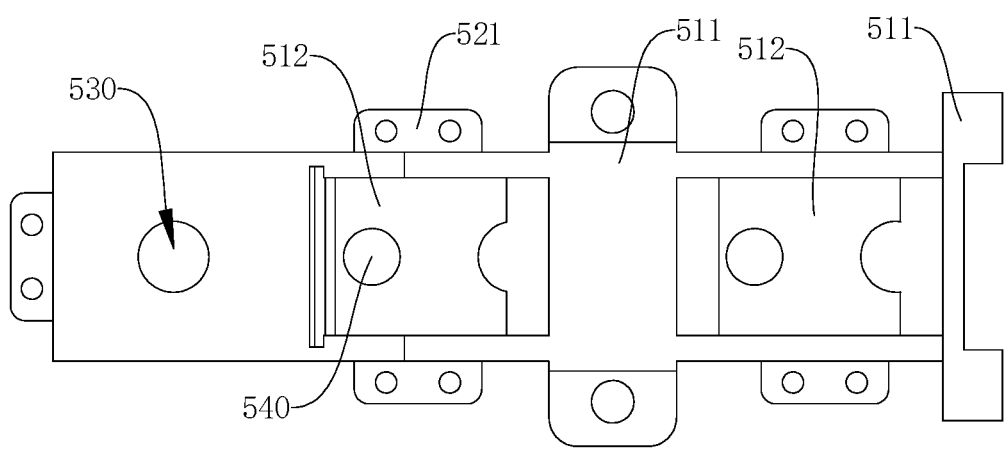
FIG. 12 is a schematic view of a plane structure of a fixing member of a separator assembly according to another embodiment of the application.

Please also refer to FIGS. 5 to 8, in which FIG. 7 is a schematic structural view of the separator assembly 10 without the busbars 300 and the circuit board 200 mounted thereon, and FIG. 8 is a rear view of FIG. 7. The arrangement of the insulating plate 100 is not limited. In some optional embodiments, the insulating plate 100 has a first mounting hole 130 and a second mounting hole 140 penetrating there. The abutting busbar 320 is located in the mounting hole 130 and is connected to the battery cell 20 in the first mounting hole 130. The first connection portion 312 and the second connection portion 313 extend to the second mounting hole 140, and the first connection portion 312 and the second connection portion 313 are both connected to the battery cell 20 in the second mounting hole 140.

The lower connection sheet 410 may be arranged in various ways. In some optional embodiments, the lower connection sheet 410 comprise a first divisional sheet 411. The first divisional sheet 411 is connected to the abutting busbar 320 and arranged across the crossover busbar 310, that is, the first divisional sheet 411 and the crossover busbar 310 are at least partially overlapped in the height direction, and the first divisional sheet 411 protrude from both sides of the crossover bus 310 in the width direction, such that the abutting busbar 320 is connected to the circuit board 200 via the first divisional sheet 411.

Wherein when the insulating plate 100 comprises the first mounting hole 130, one end of the first divisional sheet 411 extends into the first mounting hole 130 and is interconnected with the abutting busbar 320 in the first mounting hole 130. Optionally, the first divisional sheet 411 is interconnected with the abutting busbar 320 at the side of the abutting busbar 320 facing away from the battery cell 20, thereby ensuring mutual insulation between the first divisional sheet 411 and the battery cell 20.

Further, the lower connection sheet 410 further comprises a second divisional sheet 412, which is connected between the first divisional sheet 411 and the circuit board 200. Optionally, the second divisional sheet 412 and the first divisional sheet 411 are arranged to intersect. In some other optional embodiments, the second divisional sheet 412 is interconnected with the first divisional sheet 411 at the side of the circuit board 200 facing away from the insulating plate 100, ensuring that the first divisional sheet 411 and the battery cell 20 are insulated from each other.

The connection position of the first divisional sheet 411 and the second divisional sheet 412 is not limited. In some optional embodiments, the circuit board 200 is provided with a relief notch 210 at an edge in the width direction. The first divisional sheet 411 extends from the abutting busbar 320 to the relief notch 210, and the first divisional sheet 411 and the second divisional sheet 412 are interconnected at the relief notch 210. When the crossover busbar 310 and the circuit board 200 are in close proximity, the relief notch 210 provides a clearance for connection of the lower connection sheet 410 and the circuit board 200, such that the first divisional sheet 411 and the second divisional sheet 412 may be interconnected in the relief notch 210. Thereby the space is saved such that the relative position of the various components within the entire separator assembly 10 is compact.

The shape of the first divisional member 411 is not limited. The first divisional sheet 411 may extend linearly in the width direction; or the first divisional sheet 411 may be formed by extending in a bending path, as long as the first divisional sheet 411 can extend from the abutting busbar 320 to the relief notch 210 of the circuit board 200.

The lower connection sheet 410 can be arranged on the insulating plate 100. In some optional embodiments, a groove 110 is formed in the surface of the insulating plate 100, and at least a portion of the lower connection sheet 410 is engaged in the groove 110. It ensures the stability of the relative position between the lower connection sheet 410 and the insulating plate 100, so as to further improve the stability between the relative positions of the components of the separator assembly 10 upon shaking under force. When the lower connection sheet 410 comprises the first divisional sheet 411 and the second divisional sheet 412, at least a portion of the first divisional sheet 411 is engaged in the groove 110.

The groove 110 has a bottom wall 111 and a side wall 112 connected to the peripheral side of the bottom wall 111. In order to further improve the stability of the relative position between the lower connection sheet 410 and the groove 110, the bottom wall 111 is provided with a post 113, and the lower connection sheet 410 comprises a locating hole 411*a* penetrating there. The post 113 is engaged in the locating hole 411*a* when the lower connection sheet 410 is located in the groove 110, so as to further improve the stability of the relative position between the lower connection sheet 410 and the groove 110. When the lower connection sheet 410 comprises the first divisional sheet 411, the locating hole 411*a* is arranged in the first divisional sheet 411.

Further, in order to ensure the stability of the relative position between the lower connection sheet 410 and the insulating plate 100 and at the same time ensure insulation between the lower connection sheet 410 and the battery cell 20, also referring to FIGS. 9 to 12, in some optional embodiments, the separator assembly 10 further comprises an insulating fixing member 500, which is adapted to the groove 110 in shape. The fixing member 500 is located on the side of the lower connection sheet 410 facing away from the groove 110, and fixes the lower connection sheet 410 in the groove 110.

In order to ensure that stability of the relative position between the fixing member 500 and the groove 110, the fixing member 500 is provided with a first plug-in part 520, and the groove 110 is provided with a second plug-in part 120 matched with the first plug-in part 520. The fixing member 500 is fixed in the groove 110 by the plug-in fitting of the first plug-in part 520 and the second plug-in part 120.

The first plug-in part 520 and the second plug-in part 120 can be arranged in various ways. In some optional embodiments, the fixing member 500 comprises a body portion 510, the first plug-in part 520 is a plug-in sheet 521 protruding from the body portion 510, and the second plug-in part 120 is a plug-in slot 121 recessed in the side wall 112. The shape of the plug-in sheet 521 and the plug-in slot 121 are adapted in shape, such that the fixing member 500 is fixed in the groove 110 when the plug-in sheet 521 is inserted into the plug-in slot 121.

The amount of the first plug-in parts 520 and the second plug-in parts 120 is not limited, and the first plug-in part 520 and second plug-in part 120 may each be one. Or in some other optional embodiments, there are a plurality of first plug-in parts 520 arranged at intervals on the peripheral side of the body portion 510. Accordingly, there are accordingly a plurality of second plug-in parts 120 arranged to be corresponding to the plurality of first plug-in parts 520 respectively, and the plurality of second plug-in parts 120 are distributed at intervals on the side walls 112 of the groove 110.

Wherein the first plug-in parts 520 are arranged on the side surface 515 of the body portion 510 to cooperate with the second plug-in part 120. A plurality of first plug-in parts 520 being arranged at intervals on the peripheral side of the body portion 510 means that a plurality of first plug-in parts 520 are arranged at intervals on the side surface 515 of the body portion 510. The body portion 510 has a bottom surface 513 mating with the bottom wall 111 of the groove 110, and a top surface 514 opposite to the bottom surface 513. The side surface 515 is connected between the bottom surface 513 and the top surface 514.

The arrangement of the first plug-in part 520 and the second plug-in part 120 is not limited to this. For example, when the first plug-in part 520 is the plug-in sheet 521, the plug-in sheet 521 is provided with a plug-in hole 522 penetrating there, a plug-in post is formed in the plug-in slot 121, and the plug-in hole 522 and the plug-in post are adapted in shape, such that the plug-in post is located in the plug-in hole 522 when the plug-in sheet 521 is located in the plug-in slot 121. The stability of the relative position between the first plug-in part 520 and the second plug-in part 120 is further improved, and thereby the stability of the relative position between the fixing member 500 and the groove 110 is further improved.

In some other optional embodiments, the fixing member 500 is further provided with a locating hole 530, such that the post 113 can pass through the locating hole 411a and the locating hole 530 sequentially when the lower connection sheet 410 is fixed in the groove 110 by the fixing member 500. In some still other optional embodiments, the bottom wall 111 of the fixing member 500 is further provided with a locating post 540, and the bottom wall 111 of the groove 110 is further provided with a fixing hole 114 penetrating there, such that the locating post 540 can pass through the locating hole 411a and the fixing hole 114 sequentially when the lower connection sheet 410 is fixed in the groove 110 by the fixing member 500.

The arrangement of the fixing member 500 is not limited to this. The fixing member 500 further comprises an enclosing portion 511 and a cover portion 512 sequentially connected in the extending direction thereof. The enclosing portion 511 has a through hole 511a penetrating in the extending direction. The lower connection sheet 410 is inserted into the through hole 511a. The cover portion 512 covers a portion of the lower connection sheet 410 in the groove 110. When the lower connection sheet 410 comprises the first divisional sheet 411, the cover portion 512 covers a portion of the first divisional sheet 411 in the groove 110. Thus, the stability of the relative position between the lower connection sheet 410 and the insulating plate 100 is further improved, while the insulation of the lower connection sheet 410 and the battery cell 20 is ensured.

The extending direction and shape of the fixing member 500 are not limited. The fixing member 500 may be formed by extending in the width direction. Or the fixing member 500 may be formed by extending in a bending path, as long as the fixing member 500 can fix the lower connection sheet 410 in the groove 110.

Figure 13:
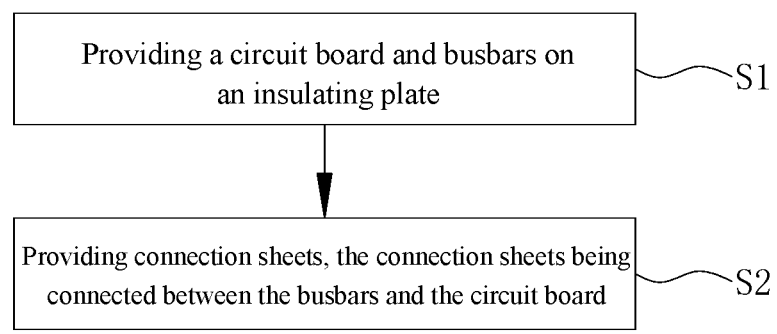
FIG. 13 is a flow chart of a method of manufacturing a separator assembly of a battery module according to still another embodiment of the application.

Also referring to FIG. 13, the application further provides a forming method for a separator assembly, in which the separator assembly is that described in any of the above first embodiments. The forming method comprises:

Step S1: providing a circuit board and busbars on the insulating plate.

As described above, the busbars 300 are located on at least one side of the circuit board 200 in the width direction.

The mounting order of the circuit board 200 and the busbars 300 is not limited herein. The circuit board 200 may be mounted at a middle position of the insulating plate 100 at first, and then the busbars 300 may be mounted on both sides of the circuit board 200. Alternatively, the busbars 300 may be mounted on the insulating plate 100 at first, and then the circuit board 200 may be mounted at a middle position of the insulating plate.

Step S2: providing connection sheets, the connection sheets being connected between the busbars and the circuit board.

The connection sheets 400 comprise an upper connection sheet 420 and a lower connection sheet 410. The insulating plate 100 comprises a first surface 150 and a second surface 160 opposite to each other. The upper connection sheet 420 is arranged on the first surface 150. The insulating plate 100 and the lower connection sheet 410 are arranged to be at least partially overlapped in the height direction of the separator assembly 10, and at least a portion of the lower connection sheet 410 is arranged on the second surface 460.

The sequence of the steps S1 and S2 is not limited, and the way to set the sequence of the steps S1 and S2 may be changed according to the actual process requirements.

When a fixing member 500 is provided on the insulating plate 100 and the lower connection sheet 410 comprises a first divisional sheet 411 and a second divisional sheet 412, the step S1 further comprises:

S01: forming a fixing member with a first divisional sheet.

In the above step S01, at least a portion of the first divisional sheet 411 is wrapped by the fixing member 500, and both ends of the first divisional sheet 411 protrude from the fixed member 500. There are various implementations for S01. For example, the first divisional sheet 411 is directly placed into a mold and injection-molded as the fixing member 500 with the first divisional sheet 411. Alternatively, the fixing member 500 is injection-molded in the mold at first, and then the first divisional sheet 411 is mounted to the fixing member. It is only required that at least a portion of the first divisional sheet 411 is wrapped by the fixing member 500 and both ends of the first divisional sheet 411 protrude from the fixing member 500.

S02: placing the aforesaid fixing member with the first divisional sheet into a mold so as to be injection-molded as an insulating plate.

In the above step S02, the insulating plate 100 comprises a first surface 150 and a second surface 160 opposite to each other. At least a portion of the first divisional sheet 411 is located on the second surface 160. The insulating plate 100 has a first mounting hole 130 and a second mounting hole 140 penetrating there. One end of the first divisional sheet 411 protrudes into the first mounting hole 130.

The busbars 300 comprise a crossover busbar 310 and an abutting busbar 320. At this point the step S1 comprises:

arranging the abutting busbar 300 in the first mounting hole 130, on the same side of the circuit board 200, arranging at least a portion of the crossover busbar 310 on the side of the abutting busbar 320 facing towards the circuit board 200, and both ends of the crossover busbar 310 being arranged to be corresponding to the second mounting holes 140.

Step S2 further comprises: arranging a second divisional sheet 412 between the first divisional sheet 411 and the circuit board 200, arranging the upper connection sheet 420 between the crossover busbar 310 and the circuit board 200, and welding the upper connection sheet 420, the first divisional sheet 411 and the second divisional sheet 412, such that the upper connection sheet 420 is connected between the circuit board 200 and the crossover busbar 310, the first divisional sheet 411 being connected between the abutting busbar 320 and the second divisional sheet 412, the second divisional sheet 412 being connected between the circuit board 200 and the first divisional sheet 411.

The welding order of the upper connection sheet 420, the first divisional sheet 411 and the second divisional sheet 412 is not limited herein. The upper connection sheet 420 may be welded between the crossover busbar 310 and the circuit board 200 at first, and then the second divisional sheet 412 is welded between the first divisional sheet 411 and the circuit board 200, and the first divisional sheet 411 are welded with the abutting busbar 320 at last. Alternatively, the second divisional sheet 412 is welded between first divisional sheet 41 and the circuit board 200 first, and then the upper connection sheet 420 is welded between the crossover busbar 310 and the circuit board 200, and the first divisional sheet 411 and the abutting busbar 320 are welded at last. It is also possible that the first divisional sheet 411 and the abutting busbar 320 are welded first, and then the upper connection sheet 420 and the second divisional sheet 412 are welded.

It will be appreciated that the busbars 300 and a pole 21 of the battery cell 20 are welded to each other when the separator assembly 10 is arranged in the battery module 1. The sequence of welding the busbars 300 and the pole post 21 and welding the busbars 300 and connection sheets 400 is not limited. The corresponding positions of the busbars 300 may be welded to the pole pillars 21 at first. Alternatively, the connection sheets 400 may be welded between the busbars 300 and the circuit board 200 at first.

The application may be implemented in other specific forms without departing from the spirit and essential characteristics thereof. For example, the algorithms described in the specific embodiments may be modified while the system architecture does not depart from the basic spirit of the application. Accordingly, the current embodiments are to be considered in all respects as illustrative rather than restrictive. The scope of the application is defined by the appended claims rather than the foregoing description. Moreover, all the changes that fall within the scope of the meaning and equivalents of the claims are thus encompassed in the scope of the application.

What is claimed is:

1. A separator assembly for a battery module, the separator assembly comprising an insulating plate, a circuit board, busbars and connection sheets, the circuit board being arranged on the insulating plate, the busbars being arranged on the insulating plate on at least one side of the circuit board, the connection sheets being connected between the busbars and the circuit board;
wherein the connection sheets comprise an upper connection sheet and a lower connection sheet, the insulating plate comprising a first surface and a second surface opposite to each other, the upper connection sheet being arranged on the first surface, the insulating plate and the lower connection sheet being arranged to be at least partially overlapped in a height direction of the separator assembly, and at least a portion of the lower connection sheet being arranged on the second surface.

2. The separator assembly according to claim 1, wherein the busbars comprise a crossover busbar and an abutting busbar, on the same side of the circuit board, at least a portion of the crossover busbar being located on the side of the abutting busbar facing towards the circuit board;
the crossover busbar is connected to the circuit board via the upper connection sheet, the abutting busbar being connected to the circuit board via the lower connection sheet, the lower connection sheet and the crossover busbar being at least partially overlapped in the height direction.

3. The separator assembly according to claim 2, wherein the crossover busbar comprises a shoulder and a first connection portion and a second connection portion at two ends of the shoulder, and on the same side of the circuit board, the shoulder is located on a side of the abutting busbar facing towards the circuit board, the shoulder being connected to the circuit board via the upper connection sheet;
the lower connection sheet and the shoulder are arranged to be at least partially overlapped in the height direction.

4. The separator assembly according to claim 2, wherein the lower connection sheet comprises a first divisional sheet connected to the abutting busbar, the first divisional sheet and the crossover busbar being at least partially overlapped in the height direction, and two ends of the first divisional sheet protruding from two sides of the crossover busbar in a width direction of the separator assembly.

5. The separator assembly according to claim 4, wherein the lower connection sheet further comprises a second divisional sheet, via which the first divisional sheet is connected to the circuit board.

6. The separator assembly according to claim 5, wherein the circuit board is provided with a relief notch at an edge in the width direction, the first divisional sheet extending from the abutting busbar to the relief notch, and the first divisional sheet being interconnected with the second divisional sheet at the relief notch.

7. The separator assembly according to claim 1, wherein a surface of the insulating plate is recessed to form a groove, in which at least a portion of the lower connection sheet is engaged.

8. The separator assembly according to claim 7, wherein the groove has a bottom wall and a side wall connected to the peripheral side of the bottom wall, the bottom wall being provided with a post, the lower connection sheet being provided with a locating hole penetrating there, the post being engaged in the locating hole.

9. The separator assembly according to claim 8, further comprising an insulating fixing member adapted to the groove in shape, the fixing member fixing the lower connection sheet in the groove.

10. The separator assembly according to claim 9, wherein the fixing member is provided with a first plug-in part, and the groove is provided with a second plug-in part adapted to the first plug-in part, the fixing member being fixed in the groove by the first plug-in part and the second plug-in part.

11. The separator assembly according to claim 10, wherein the fixing member comprises a body portion, the first plug-in part being a plug-in sheet arranged to protrude from the body portion, the second plug-in part being a plug-in slot formed by the recessed side wall.

12. The separator assembly according to claim 11, wherein the plug-in sheet is provided with a plug-in hole penetrating there, the plug-in slot being provided with a plug-in post therein, the plug-in hole and the plug-in post are adapted in shape, such that the plug-in post is located in the plug-in hole when the plug-in sheet is located in the plug-in slot.

13. The separator assembly according to claim 11, wherein
the fixing member is provided with a plurality of first plug-in parts arranged at intervals on the peripheral side of the body portion;

there are a plurality of second plug-in parts corresponding to the plurality of first plug-in parts, and the plurality of second plug-in parts are distributed at intervals on the side wall of the groove.

14. The separator assembly according to claim 9, wherein the fixing member comprises an enclosing portion and a cover portion which are sequentially connected in an extending direction thereof, the enclosing portion having a through hole penetrating there in the extending direction, the lower connection sheet being inserted in the through hole, the cover portion covering a portion of the lower connection sheet in the groove.

15. A battery module comprising:
a plurality of battery cells arranged side by side in a length direction of the battery module;
the separator assembly according to claim 1, the busbars being connected to the battery cells respectively to form a power supply path.

16. A battery pack comprising:
a case having an accommodation space;
the battery module according to claim 15, the battery module being arranged in the accommodation space.

17. An apparatus employing a battery module as a power source comprising:
a power supply for supplying power to the apparatus;
the battery module according to claim 15 configured to supply electric energy to the power supply.

18. A method of manufacturing a separator assembly for a battery module, comprising:
providing a circuit board and busbars on an insulating plate and the busbars being located on at least one side of the circuit board in a width direction of the separator assembly;
providing connection sheets, the connection sheets being arranged between the busbars and the circuit board, wherein the connection sheets comprises an upper connection sheet and a lower connection sheet, the insulating plate comprising a first surface and a second surface opposite to each other, the upper connection sheet being arranged on the first surface, the insulating plate and the lower connection sheet being arranged to be at least partially overlapped in a height direction of the separator assembly, at least a portion of the lower connection sheet being arranged on the second surface.

19. The method of claim 18, wherein the lower connection sheet comprises a first divisional sheet and a second divisional sheet,
the step of providing the circuit board and the busbars on the insulating plate and the busbars being located on at least one side of the circuit board in the width direction of the separator assembly further comprising:
forming a fixing member with the first divisional sheet, at least a portion of the first divisional sheet being wrapped by the fixing member, and two ends of the first divisional sheet protruding from the fixing member;
placing the fixing member with the first divisional sheet in a mold, injection molding the insulating plate, and at least a portion of the first divisional sheet being located on the second surface, the insulating plate having a first mounting hole and a second mounting hole penetrating there, one end of the first divisional sheet protruding into the first mounting hole;
the step of providing the circuit board and the busbars on the insulating plate and the busbars being located on at least one side of the circuit board in the width direction of the separator assembly further comprising:
the busbars comprising a crossover busbar and an abutting busbar, the abutting busbar being arranged in the first mounting hole, on the same side of the circuit board, arranging at least a portion of the crossover busbar on the side of the abutting busbar facing towards the circuit board, and two ends of the crossover busbar being arranged to be corresponding to the second mounting holes;
the step of providing the connection sheets comprising: arranging the second divisional sheet between the first divisional sheet and the circuit board, arranging the upper connection sheet between the crossover busbar and the circuit board, and welding the upper connection sheet, the first divisional sheet and the second divisional sheet, such that the upper connection sheet is connected between the circuit board and the crossover busbar, the first divisional sheet being connected between the abutting busbar and the second divisional sheet, the second divisional sheet being connected between the circuit board and the first divisional sheet.

\* \* \* \* \*